(12) United States Patent
Cerny

(10) Patent No.: US 11,400,490 B2
(45) Date of Patent: Aug. 2, 2022

(54) AIR WASH ABRASIVE AND CONTAMINANTS SEPARATOR APPARATUS

(71) Applicant: James W. Cerny, Woodbine, GA (US)

(72) Inventor: James W. Cerny, Woodbine, GA (US)

( * ) Notice: Subject to any disclaimer, the term of this patent is extended or adjusted under 35 U.S.C. 154(b) by 550 days.

(21) Appl. No.: 16/446,025

(22) Filed: Jun. 19, 2019

(65) Prior Publication Data

US 2019/0381536 A1 Dec. 19, 2019

Related U.S. Application Data

(60) Provisional application No. 62/687,041, filed on Jun. 19, 2018.

(51) Int. Cl.
*B24C 9/00* (2006.01)
*B07B 4/04* (2006.01)
*B24B 55/06* (2006.01)
*B22C 5/10* (2006.01)
*B07B 4/02* (2006.01)

(52) U.S. Cl.
CPC ............... *B07B 4/04* (2013.01); *B07B 4/025* (2013.01); *B22C 5/10* (2013.01); *B24B 55/06* (2013.01); *B24C 9/006* (2013.01)

(58) Field of Classification Search
CPC ........... B24C 3/02; B24C 3/065; B24C 9/003; B24C 9/006; B24B 55/06; B07B 4/04; B07B 4/025; B22C 5/10

USPC .............................................. 451/2, 3, 87, 88
See application file for complete search history.

(56) References Cited

U.S. PATENT DOCUMENTS

| | | | | |
|---|---|---|---|---|
| 2,866,547 A | * | 12/1958 | Gladfelter | ............... B07B 4/025 |
| | | | | 209/33 |
| 3,368,677 A | * | 2/1968 | Bradley, Jr. | ............. B24B 55/06 |
| | | | | 209/135 |
| 3,742,651 A | | 7/1973 | Rowe | |
| 3,934,372 A | * | 1/1976 | Diehn | ..................... B24C 3/065 |
| | | | | 451/88 |
| 4,382,352 A | * | 5/1983 | Nelson | .................... B24C 3/067 |
| | | | | 451/87 |
| 4,449,331 A | | 5/1984 | MacMillan | |
| 4,693,041 A | | 9/1987 | Dickson | |
| 5,185,968 A | | 2/1993 | Lyras | |
| 9,242,251 B2 | * | 1/2016 | Reaves | ..................... B03C 1/30 |

* cited by examiner

*Primary Examiner* — Lee D Wilson
*Assistant Examiner* — Alberto Saenz
(74) *Attorney, Agent, or Firm* — Meunier Carlin & Curfman LLC

(57) ABSTRACT

An air wash abrasive particle separator apparatus which separates contaminants from previously-used abrasive particles contained in a contaminated abrasive particle mixture such that the abrasive particles may be re-used multiple times, the apparatus being in combination a contaminated abrasive particle mixture delivery device, an accumulator hopper assembly, a volume sensing device, an automatic flow control valve, a separator assembly and an air transfer device.

20 Claims, 3 Drawing Sheets

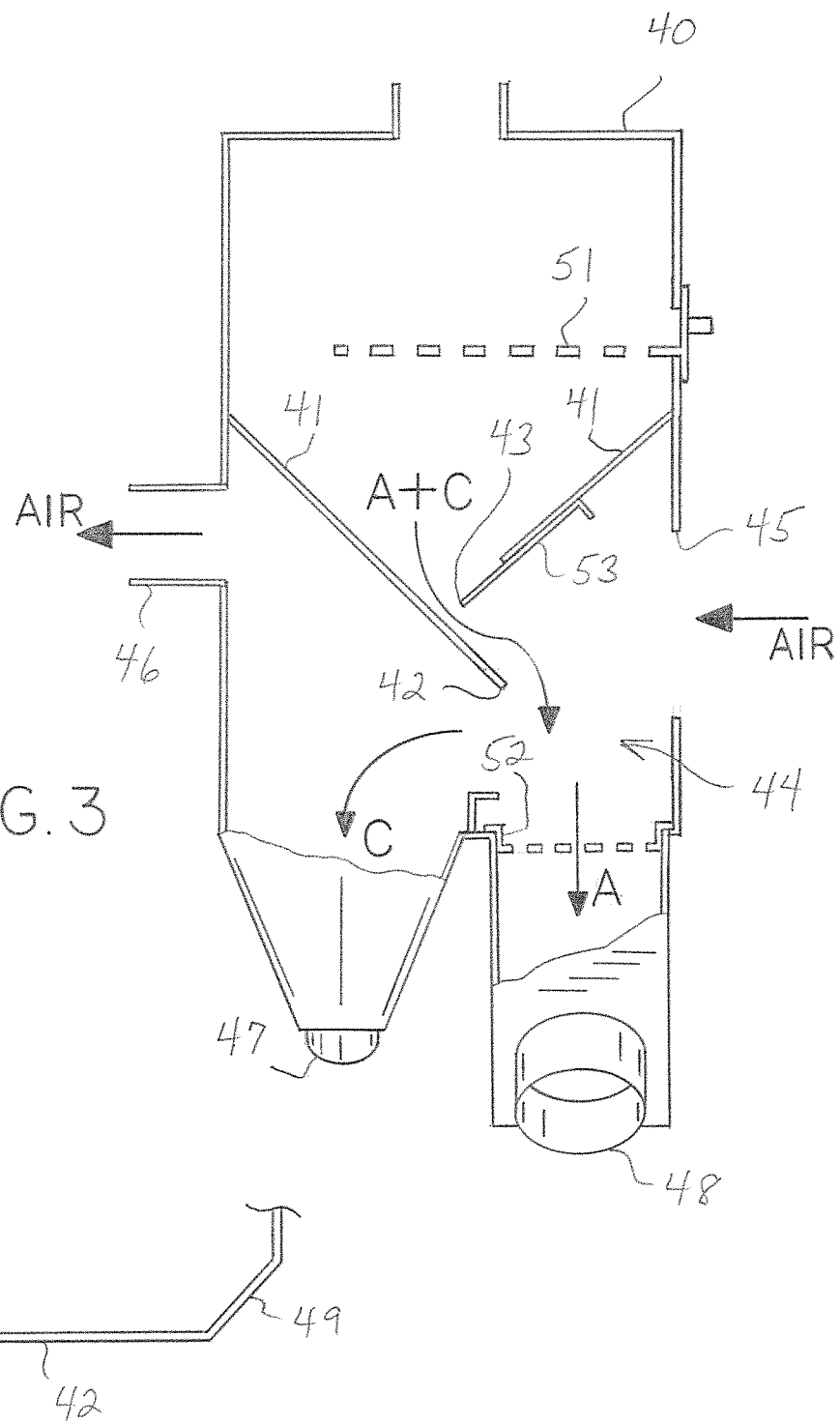

AIR WASH ABRASIVE AND CONTAMINANTS SEPARATOR APPARATUS

BACKGROUND OF THE INVENTION

This application relates generally to the field of methods and apparatuses for the separation of different particles entrained in a mixture, and more particularly relates to such methods and apparatuses for the separation of abrasive shot and contaminants such that the contaminants may be discarded and the abrasive shot re-used.

Abrasive blasting is a well-known technique for cleaning surfaces, removing paint, etc. Abrasive particles, typically referred to as shot, are impelled at high velocity against the surface to be cleaned, the hardness and other characteristics for the abrasive shot being determined by the material being removed and nature of the surface being cleaned. Since the abrasive shot is not usually rendered ineffective after a single use, it is desirable to collect and re-use the abrasive shot multiple times. To re-use the abrasive shot, however, it is necessary to separate the contaminants, such as for example dust, paint particles, scale, rust or even broken abrasive particles, from the abrasive shot.

Various techniques, apparatuses and methods have been developed to accomplish this. Some involve physical separators such as meshes or sieves. Others use impellers to distribute and separate the particles. A common method is to utilize an air wash system, wherein the contaminated abrasive particle mixture is raised by a batch or screw elevator and dumped directly into a separator assembly wherein the particle mixture is passed over an edge to form a thin waterfall or curtain of particles. Air is then directed or pulled through the gravity-fed particle curtain, such that the lighter particles, typically the contaminants, are blown laterally into one or more collector compartments or chutes, while the heavier particles, the abrasive shot, continue to fall vertically into a collector hopper. Examples of such systems may be seen in U.S. Pat. No. 2,866,547 to Gladfelter et al., U.S. Pat. No. 3,368,677 to Bradley, Jr., U.S. Pat. No. 3,742,651 to Rowe, U.S. Pat. No. 4,382,352 to Nelson, U.S. Pat. No. 4,449,331 to MacMillan, U.S. Pat. No. 4,693,041 to Dickson, and U.S. Pat. No. 5,185,968 to Lyras.

There are several problems inherent in the type of air wash abrasive separator systems in use currently. Typically, adjustment or cleaning of various components of the air wash separator, such as the air blower, the slide gate, the swinging or fixed baffle metering the particle flow, the sides of the particle chute where collection of dust reduces the curtain size, etc., is required with some frequency. In addition, performing these operations in current systems usually requires a worker to climb a significant height above the floor slab.

Another significant problem is that the flow of the contaminated abrasive particle mixture from the elevator or similar delivery device into the separator assembly is typically intermittent and inconsistent, such that the flow of particles into the separator varies from light to heavy. This reduces the efficiency of the system, and may even result in clogging, such that an operator must mechanically adjust passages within the separator. It is an object of this invention to address the problem of intermittent flow that are inherent in known systems such that flow of contaminated particles into the separator is accomplished at a steady, consistent and controlled rate, wherein an accumulator hopper assembly is positioned in line between the delivery elevator and the separator assembly, the accumulator hopper assembly comprising or in communication with an automatic flow control valve in communication with a volume sensing device positioned within the interior of the accumulator hopper assembly, such that the volume of the contaminated abrasive particle mixture within the accumulator hopper assembly is monitored and flow of the particle mixture into the separator assembly is stopped when there is insufficient volume within the accumulator hopper assembly to produce optimum efficiency in the separation process.

SUMMARY OF THE INVENTION

The invention in various embodiments comprises in general an air wash abrasive particle separator apparatus which separates contaminants, such as for example dust, paint particles, scale, rust or even broken abrasive particles, from previously-used abrasive particles contained in a contaminated abrasive particle mixture such that the abrasive particles may be re-used multiple times. The apparatus comprises a delivery device, such as an elevator for example, which delivers the contaminated mixture into an accumulator hopper assembly upstream of the separator assembly. The contaminated mixture is then gravity fed directly into the separator assembly in a metered and controlled manner through a conduit having an automatic flow control valve, such as a butterfly valve. The accumulator hopper assembly comprises a large volume chamber containing a first ledge deflector member that deflects the contaminant mixture received from the delivery elevator laterally onto a second ledge member, from which the contaminant mixture passes into and through the automatic flow control valve. The accumulator hopper chamber is structured with at least one slanted wall such that the contaminant mixture is funneled to the automatic flow control valve. One or more removable trash screens may be incorporated within the accumulator hopper to capture large contaminant particles or objects.

A volume sensing device or probe, such as for example a proximity sensor, is provided in the accumulator hopper to monitor the level of the contaminated abrasive particle mixture within the accumulator hopper chamber and to control the automatic flow control valve, such that delivery of contaminated abrasive particle mixture into the separator assembly is halted if the delivery rate of the contaminated abrasive particle mixture into the accumulator hopper assembly results in insufficient volume to maintain the optimum curtain spread in the separator assembly, the automatic flow control valve being opened again once the volume of the contaminated abrasive particle mixture within the accumulator hopper is sufficient for optimum efficiency.

The separator assembly receives the contaminated abrasive particle mixture from the accumulator hopper assembly through the automatic flow control valve. A removable first trash screen may be provided to separate any relatively large scale contaminants from the contaminated abrasive particle mixture, which then passes through a feed gap situated between two feed walls. The contaminated abrasive particle mixture then falls over a cascade edge in the form of a thin sheet or curtain. An air transfer device draws air from an air intake, through the contaminated abrasive particle mixture curtain and out an exhaust opening. This process is known as an air wash. The air flow pushes lighter contaminants horizontally from the cascade, while the heavier abrasive particles continue to fall vertically. In this manner the lighter contaminants are directed into a contaminant discharge chute for collection and eventual discard, while the abrasive particles fall into an abrasive particle discharge chute for collection and eventual reuse. A removable second trash screen may be provided above the abrasive particle discharge chute for further separation of undesirable contaminants too heavy to be removed from the main cascade by the air wash.

In alternative summary, the invention is an air wash abrasive and contaminants separator apparatus comprising a delivery device delivering a contaminated abrasive particle mixture containing contaminants and abrasive particles; an accumulator hopper assembly receiving the contaminated abrasive particle mixture from said delivery device; a separator assembly receiving the contaminated abrasive particle mixture from said accumulator hopper assembly; an air transfer device delivering air through the contaminated abrasive particle mixture within said separator assembly such that the contaminants are separated from the abrasive particles; an automatic flow control valve disposed between said accumulator hopper assembly and said separator assembly, said automatic flow control valve controlling the flow of the contaminated abrasive particle mixture from said accumulator hopper assembly to said separator assembly; and a volume sensing device sensing the volume of the contaminated abrasive particle mixture within said accumulator hopper assembly and controlling the operation of said automatic flow control valve, whereby the flow of the contaminated abrasive particle mixture from said accumulator hopper assembly is stopped by said automatic flow control valve when the volume of the contaminated abrasive particle mixture within the accumulator hopper assembly falls below a predetermined minimum volume. Furthermore, such apparatus further comprising a conduit extending between said accumulator hopper assembly and said separator assembly, and wherein said automatic flow control valve is positioned in said conduit; said separator assembly comprising a pair of angled feed walls defining a feed gap through which the contaminated abrasive particle mixture passes; wherein one of said pair of angled feed walls comprises an edge over which the contaminated abrasive particle mixture cascades in the form of a curtain into a separation zone; further comprising a pair of angled diverting walls adjacent said edge, said angled diverting walls oriented at approximately 45 degrees; wherein said pair of angled feed walls are oriented at approximately 60 degrees; wherein said accumulator hopper assembly comprises a first ledge and a second ledge to control flow of the contaminated abrasive particle mixture; wherein said volume sensing device is a proximity probe; wherein said accumulator hopper assembly comprises at least one trash screen capturing contaminants of greater size than said abrasive particles; wherein said accumulator hopper comprises a contaminant discharge chute and an abrasive particle discharge chute; wherein said accumulator hopper comprises a contaminant discharge chute and an abrasive particle discharge chute, and wherein said at least one trash screen is positioned directly above said abrasive particle discharge chute; further comprising an adjustable gate positioned on one of said pair of angled feed walls, whereby the size of said feed gap may be adjusted; and/or wherein said air transfer device is an air suction device, and wherein said separator chamber comprises an air intake opening and an air exhaust opening.

BRIEF DESCRIPTION OF THE DRAWINGS

FIG. 3 is a cross-sectional view of the separator assembly of FIG. 1 taken along line 3-3 of FIG. 1.

FIG. 4 illustrates diverting wing walls disposed at the edge of the lowermost feed wall.

DETAILED DESCRIPTION OF THE INVENTION

Figure 1:
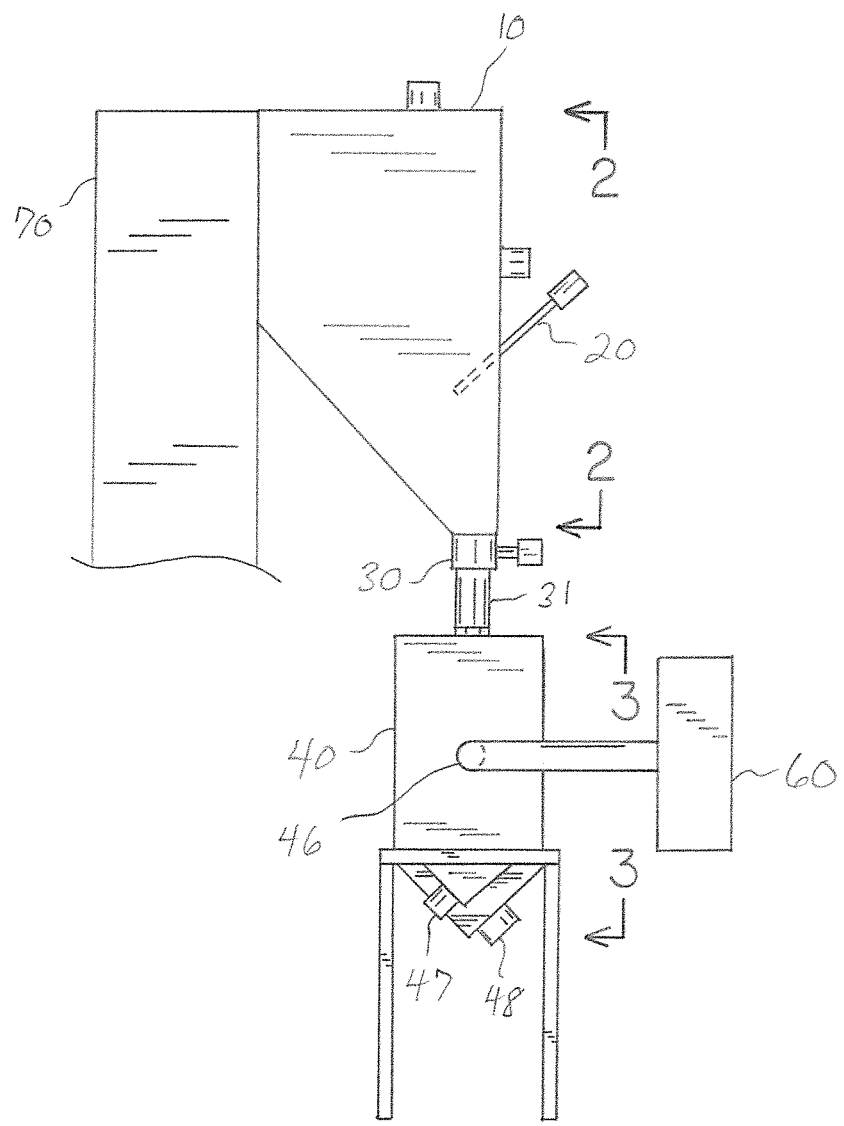
FIG. 1 is an illustration of an embodiment of the invention showing the accumulator hopper and automatic flow control valve positioned in line between the delivery elevator and the separator assembly.

With reference to the drawings, the invention will now be described in detail. The invention in various embodiments comprises in general an air wash abrasive particle separator apparatus which separates contaminants C, such as for example dust, paint particles, scale, rust or even broken abrasive particles, from previously-used abrasive particles A contained in a contaminated abrasive particle mixture (A+C) such that the abrasive particles A may be re-used multiple times. As shown in FIG. 1, the apparatus comprises the combination of a contaminated abrasive particle mixture delivery device 70, an accumulator hopper assembly 10, a volume sensing device 20, an automatic flow control valve 30, a separator assembly 40 and an air transfer device 60.

The contaminated abrasive particle mixture delivery device 70 delivers the contaminated abrasive particle mixture into the accumulator hopper assembly 10, which is positioned above and upstream of the separator assembly 40. Any known type of contaminated abrasive particle mixture delivery device 70 may be utilized, such as for example a delivery elevator (as shown) of a batch or screw design, conveyor systems, or feed conduits.

The contaminated mixture is then gravity fed directly from the accumulator hopper assembly 10 into the separator assembly 40 in a metered and controlled manner through a conduit 31 having an automatic flow control valve 30, such as for example a butterfly valve operated pneumatically, hydraulically, mechanically or electrically, positioned therein. The automatic flow control valve 30 operates in a binary manner between a full open and a full closed position.

Figure 2:
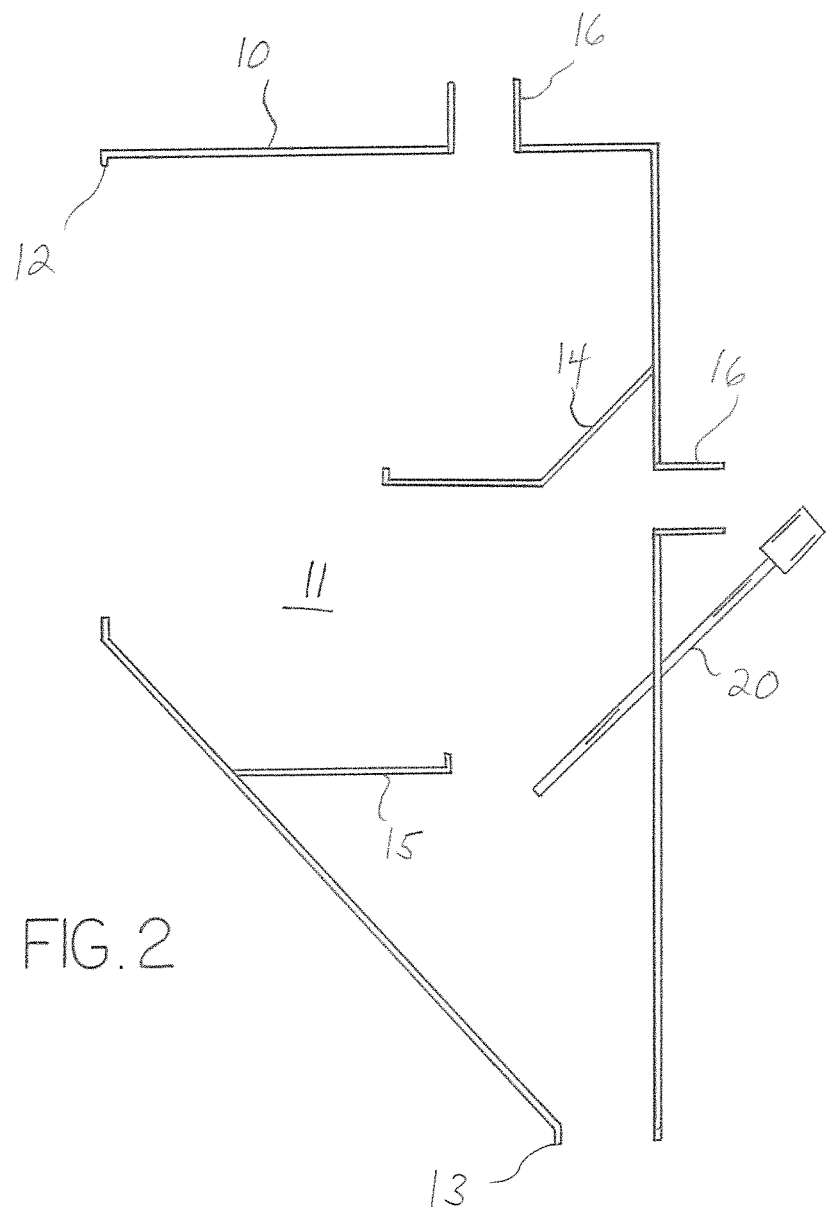
FIG. 2 is a cross-sectional view of the accumulator hopper of FIG. 1 taken along line 2-2 of FIG. 1, also showing the volume sensing device.

The accumulator hopper assembly 10, as shown in FIG. 2, comprises a large volume chamber 11 having a relatively large ingress opening 12 in communication with the discharge opening of the contaminated abrasive particle mixture delivery device 70, and an outflow opening 13 located at the bottom of the chamber 11. The accumulator hopper assembly 10 preferably contains a first ledge deflector member 14 that deflects the contaminant mixture received from the elevator delivery device 70 laterally onto a second ledge member 15, from which the contaminant mixture passes into and through the outflow opening 13 and automatic flow control valve 30. The accumulator hopper chamber 11 is structured with at least one slanted wall such that the contaminant mixture is funneled to the outflow opening 13 and automatic flow control valve 30 in a precise and controlled volume and flow rate. One or more removable trash screens (not shown) may be incorporated within the accumulator hopper chamber 11 to capture large contaminant particles or objects. Exhaust vents 16 are provided to enable the removal of dust and other airborne particulates from the chamber 11 by suction.

A volume sensing device or probe 20, such as for example a proximity sensor, is provided in the accumulator hopper chamber 11 to monitor the level of the contaminated abrasive particle mixture within the accumulator hopper chamber 11. The volume sensing device 20 is in communication with and controls the automatic flow control valve 30, such that delivery of the contaminated abrasive particle mixture into the separator assembly 40 is halted if the delivery rate of the contaminated abrasive particle mixture into the accumulator hopper assembly is insufficient to maintain a predetermined minimum volume of contaminated abrasive particle mixture within the accumulator hopper chamber 11 to provide for optimum flow and curtain spread in the separator assembly 40, the automatic flow control valve 30 being opened again once the volume of the contaminated abrasive particle mixture within the accumulator hopper chamber 11 is above the predetermined minimum volume for optimum efficiency. Maintaining the flow through the separator assembly 40 at the optimum rate and volume further minimizes undesirable build-up by fines and similar small or light contaminants C on the interior members of the separator assembly 40, as the abrasive particles A act as scrubbers to remove any fines or other contaminants C that begin to accumulate.

The separator assembly 40, a shown in FIG. 3, receives the contaminated abrasive particle mixture from the accumulator hopper assembly 10 through the automatic flow control valve 30. A removable first trash screen 51 is preferably provided to remove any contaminants C from the contaminated abrasive particle mixture which are larger than the abrasive particles A. The contaminated abrasive particle mixture then passes through a feed gap 43 situated between and defined by two slanted, generally opposing, feed walls 41, the lowermost-extending of which is positioned at approximately sixty degrees. The feed walls 41 interrupt the vertical fall of the contaminated abrasive particle mixture from the conduit 31 and spread the contaminated abrasive particle mixture laterally. An adjustable gate member 53 may be provided to adjust the size of the feed gap to accommodate various sizes of abrasive particles—increasing the gap for larger abrasive particles A and reducing the gap for smaller abrasive particles A. The contaminated abrasive particle mixture then falls over a cascade edge 42 into a separation zone 44 in the form of a thin sheet or curtain. Angled diverting walls 49, as shown in FIG. 4, may be provided as wing members at the ends of the cascade edge 42, preferably set at approximately 45 degrees, to prevent accumulation of the contaminated abrasive particle mixture, particularly fines contained in the mixture, and to better define the curtain shape.

The separator assembly 40 further comprises an air transfer device 60 to forcibly separate the contaminants C from the abrasive particles A in the cascade curtain, the contaminants C being lighter than the abrasive particles A. The air transfer device 60 is preferably an air suction device that draws external air at a sufficiently high velocity through an air intake opening 45 in the side of the separator assembly 40, through the separation zone 44 containing the contaminated abrasive particle mixture curtain and out through an air exhaust opening 46 on the opposite side of the separator assembly 40. The air intake opening 45 may comprise apertures, screens, filters of the like. Alternatively, the air transfer device 60 may be an air delivery device which to blows air into the separation zone 44 and through the cascade, in effect reversing the process. This process is commonly referred to as an air wash. The air flow pushes or pulls the lighter contaminants C horizontally from the cascade curtain, while the heavier abrasive particles A continue to fall vertically. In this manner the lighter contaminants C are directed into a contaminant discharge chute 47 for collection and eventual discard, while the abrasive particles A fall into an abrasive particle discharge chute 48 for collection and eventual reuse. A removable second trash screen 52 may be provided directly above the abrasive particle discharge chute 48 for further separation of undesirable contaminants C larger than the abrasive particles A too heavy to have been removed from the main cascade curtain by the air wash. The separator assembly 40 is preferably mounted above floor level or in such manner that accumulation barrels or similar means may be positioned beneath the contaminant discharge chute 47 and the abrasive particle discharge chute 48.

One key advantage of this air wash abrasive particle separator apparatus as described is that a swinging baffle or similar levelling means is not required within the separator assembly 40 to control the volume, thickness and distribution of the contaminated abrasive particle mixture within the cascading curtain, since the structure as shown herein provides precise metering of the flow into the separator assembly 40 such that there is no excessive build-up of the contaminated abrasive particle mixture within the separator assembly 40. This baffle structure is common to current systems and is the cause of recurring maintenance issues.

In practice the air wash abrasive particle separator apparatus as described has been shown to reduce the amount of contaminants C remaining in the reclaimed abrasive particles A by as much as 30 percent.

It is understood that equivalents and substitutes for certain elements set forth above may be obvious to those of ordinary skill in the art, and therefore the true scope and definition of the invention is to be as set forth in the following claims.

I claim:

1. An air wash abrasive and contaminants separator apparatus comprising:
    a delivery device delivering a contaminated abrasive particle mixture containing contaminants and abrasive particles;
    an accumulator hopper assembly receiving the contaminated abrasive particle mixture from said delivery device;
    a separator assembly receiving the contaminated abrasive particle mixture from said accumulator hopper assembly;
    an air transfer device delivering air through the contaminated abrasive particle mixture within said separator assembly such that the contaminants are separated from the abrasive particles;
    an automatic flow control valve disposed between said accumulator hopper assembly and said separator assembly, said automatic flow control valve controlling a flow of the contaminated abrasive particle mixture from said accumulator hopper assembly to said separator assembly, wherein said automatic flow control valve is a butterfly valve; and
    a volume sensing device sensing a volume of the contaminated abrasive particle mixture within said accumulator hopper assembly and controlling an operation of said automatic flow control valve, whereby the flow of the contaminated abrasive particle mixture from said accumulator hopper assembly is stopped by said automatic flow control valve when the volume of the contaminated abrasive particle mixture within the accumulator hopper assembly falls below a predetermined minimum volume.

2. The apparatus of claim 1, further comprising a conduit extending between said accumulator hopper assembly and said separator assembly, and wherein said automatic flow control valve is positioned in said conduit.

3. The apparatus of claim 1, said separator assembly comprising a pair of angled feed walls defining a feed gap through which the contaminated abrasive particle mixture passes.

4. The apparatus of claim 3, wherein one of said pair of angled feed walls comprises an edge over which the contaminated abrasive particle mixture cascades in the form of a curtain into a separation zone.

5. The apparatus of claim 4, further comprising a pair of angled diverting walls adjacent said edge, said angled diverting walls oriented at approximately 45 degrees.

6. The apparatus of claim 4, wherein said pair of angled feed walls are oriented at approximately 60 degrees.

7. The apparatus of claim 3, further comprising an adjustable gate positioned on one of said pair of angled feed walls, whereby a size of said feed gap may be adjusted.

8. The apparatus of claim 1, wherein said accumulator hopper assembly comprises a first ledge and a second ledge to control flow of the contaminated abrasive particle mixture.

9. The apparatus of claim 1, wherein said volume sensing device is a proximity probe.

10. The apparatus of claim 1, wherein said separator assembly comprises at least one trash screen capturing contaminants of greater size than said abrasive particles.

11. The apparatus of claim 9, wherein said separator assembly comprises a contaminant discharge chute and an abrasive particle discharge chute, and wherein said at least one trash screen is positioned directly above said abrasive particle discharge chute.

12. The apparatus of claim 1, wherein said separator assembly comprises a contaminant discharge chute and an abrasive particle discharge chute.

13. The apparatus of claim 1, wherein said air transfer device is an air suction device, and wherein said separator assembly comprises an air intake opening and an air exhaust opening.

14. An air wash abrasive and contaminants separator apparatus comprising:
a delivery device delivering a contaminated abrasive particle mixture containing contaminants and abrasive particles;
an accumulator hopper assembly receiving the contaminated abrasive particle mixture from said delivery device;
a separator assembly receiving the contaminated abrasive particle mixture from said accumulator hopper assembly, said separator assembly comprising a contaminant discharge chute, an abrasive particle discharge chute, and a pair of angled feed walls defining a feed gap through which the contaminated abrasive particle mixture passes, wherein one of said pair of angled feed walls comprises an edge over which the contaminated abrasive particle mixture cascades in the form of a curtain into a separation zone;
a conduit connecting said accumulator hopper assembly to said separator assembly;
an air transfer device delivering air through the contaminated abrasive particle mixture within said separation zone of said separator assembly such that the contaminants are separated from the abrasive particles;
an automatic flow control valve disposed in said conduit between said accumulator hopper assembly and said separator assembly, said automatic flow control valve controlling a flow of the contaminated abrasive particle mixture from said accumulator hopper assembly to said separator assembly, wherein said automatic flow control valve is a butterfly valve; and
a volume sensing device sensing a volume of the contaminated abrasive particle mixture within said accumulator hopper assembly and controlling an operation of said automatic flow control valve, whereby the flow of the contaminated abrasive particle mixture from said accumulator hopper assembly is stopped by said automatic flow control valve when the volume of the contaminated abrasive particle mixture within the accumulator hopper assembly falls below a predetermined minimum volume.

15. The apparatus of claim 14, wherein said pair of angled feed walls are oriented at approximately 60 degrees.

16. The apparatus of claim 14, further comprising an adjustable gate positioned on one of said pair of angled feed walls, whereby a size of said feed gap may be adjusted.

17. The apparatus of claim 14, further comprising a pair of angled diverting walls adjacent said edge, said angled diverting walls oriented at approximately 45 degrees.

18. The apparatus of claim 14, wherein said separator assembly comprises at least one trash screen capturing contaminants of greater size than said abrasive particles.

19. The apparatus of claim 18, wherein said at least one trash screen is positioned directly above said abrasive particle discharge chute.

20. The apparatus of claim 14, wherein said air transfer device is an air suction device, and wherein said separator assembly comprises an air intake opening and an air exhaust opening.

* * * * *